US009705991B2

United States Patent
Mäder et al.

(10) Patent No.: US 9,705,991 B2
(45) Date of Patent: Jul. 11, 2017

(54) ADAPTATION OF RADIO RESOURCES ALLOCATION IN AN INTELLIGENT TRANSPORT SYSTEM ENABLED CELLULAR MOBILE NETWORK AND METHOD FOR OPERATING SUCH NETWORK

(75) Inventors: Andreas Mäder, Heidelberg (DE); Long Le, Berlin (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/410,600

(22) PCT Filed: Jul. 4, 2012

(86) PCT No.: PCT/EP2012/063001
§ 371 (c)(1),
(2), (4) Date: Dec. 23, 2014

(87) PCT Pub. No.: WO2014/005629
PCT Pub. Date: Jan. 9, 2014

(65) Prior Publication Data
US 2015/0326668 A1 Nov. 12, 2015

(51) Int. Cl.
*B60Q 1/00* (2006.01)
*H04M 11/04* (2006.01)
(Continued)

(52) U.S. Cl.
CPC ....... *H04L 67/12* (2013.01); *G08G 1/096716* (2013.01); *G08G 1/096758* (2013.01);
(Continued)

(58) Field of Classification Search
None
See application file for complete search history.

(56) References Cited

U.S. PATENT DOCUMENTS

2004/0245853 A1* 12/2004 Odagawa ............... G08G 1/164
303/191
2008/0192677 A1* 8/2008 Abusch-Magder ... H04W 8/082
370/328

(Continued)

OTHER PUBLICATIONS

3GPP: "3rd Generation Partnership Project; Technical Specification Group Radio Access Network; Study on RAN Improvements for Machine-type Communications; (Release 11)", 3GPP Draft, vol. RAN WG2, Sep. 26, 2011, XP050539364.

(Continued)

*Primary Examiner* — Moustapha Diaby
(74) *Attorney, Agent, or Firm* — Leydig, Voit & Mayer, Ltd.

(57) ABSTRACT

An Intelligent Transport System enabled cellular mobile network, comprising an infrastructure including a number of base stations (5), and a number of vehicles (4) being equipped with both vehicle-to-vehicle and vehicle-to-infrastructure communication facilities, wherein particular events function as trigger for said vehicles (4) to send event specific warning messages to their serving base station (5*a*) within said infrastructure, is characterized in that said base stations (5) comprise an evaluation module being configured to analyze and categorize warning messages received from any of said vehicles (4) according to predefinable criteria, and to estimate the number of vehicles (4) that may be affected by the event related to a warning message, and a control module for performing uplink radio resource adaptation dependent on said warning message's category and said estimated number of affected vehicles (4).

14 Claims, 3 Drawing Sheets

Figure 1:
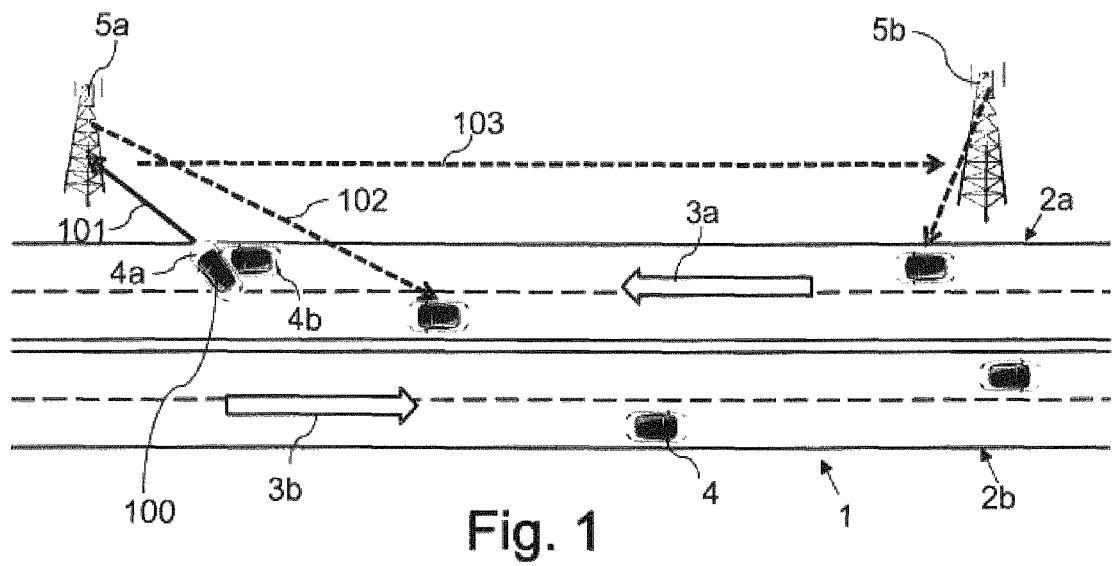

(51) Int. Cl.
　　　*H04W 4/00*　　　(2009.01)
　　　*H04L 29/08*　　　(2006.01)
　　　*H04W 4/12*　　　(2009.01)
　　　*H04W 4/22*　　　(2009.01)
　　　*G08G 1/0967*　　　(2006.01)
　　　*H04W 72/04*　　　(2009.01)
　　　*H04W 88/08*　　　(2009.01)
　　　*H04W 4/04*　　　(2009.01)

(52) U.S. Cl.
　　　CPC ........ *G08G 1/096783* (2013.01); *H04W 4/12* (2013.01); *H04W 4/22* (2013.01); *H04W 72/04* (2013.01); *H04W 4/046* (2013.01); *H04W 88/08* (2013.01)

(56) References Cited

U.S. PATENT DOCUMENTS

| | | | | |
|---|---|---|---|---|
| 2008/0225785 | A1* | 9/2008 | Wang | H04W 74/002 370/329 |
| 2009/0327352 | A1* | 12/2009 | Thomas | G06Q 10/107 |
| 2010/0041389 | A1* | 2/2010 | Cave | H04W 76/028 455/423 |
| 2010/0248680 | A1* | 9/2010 | Agulnik | H04W 74/006 455/404.2 |
| 2011/0134884 | A1* | 6/2011 | Shiizaki | H04W 74/0866 370/331 |
| 2011/0194469 | A1* | 8/2011 | Henderson | H04W 16/12 370/281 |
| 2012/0163231 | A1* | 6/2012 | Bertrand | H04L 1/0007 370/252 |
| 2012/0219043 | A1* | 8/2012 | Ko | H04B 7/024 375/219 |
| 2012/0229302 | A1* | 9/2012 | Sri-Jayantha | G08G 1/0112 340/905 |
| 2013/0110344 | A1* | 5/2013 | Merg | G07C 5/008 701/31.4 |
| 2013/0325940 | A1* | 12/2013 | Foti | H04W 4/046 709/204 |

OTHER PUBLICATIONS

Evgeny Osipov: "Technology and Business Aspects of M2M communications", COST WiNeMO, Jun. 6, 2012, XP002688355.
"Intelligent Transport Systems (ITS); Framework for Public Mobile Networks in Cooperative ITS (C-ITS)", Technical Report, European Telecommunications Standards Institute (ETSI), vol. ITS WG2, No. V1.1.1, Feb. 1, 2012, XP014069748, section 5.4.

\* cited by examiner

ADAPTATION OF RADIO RESOURCES ALLOCATION IN AN INTELLIGENT TRANSPORT SYSTEM ENABLED CELLULAR MOBILE NETWORK AND METHOD FOR OPERATING SUCH NETWORK

The present invention relates to an ITS enabled cellular mobile network, comprising an infrastructure including a number of base stations, and a number of vehicles being equipped with both vehicle-to-vehicle and vehicle-to-infrastructure communication facilities, wherein particular events function as trigger for said vehicles to send event specific warning messages to their serving base station within said infrastructure.

Furthermore, the present invention relates to a method for operating an ITS enabled cellular mobile network, wherein said network comprises a number of vehicles and an infrastructure including a number of base stations, wherein said vehicles are equipped with both vehicle-to-vehicle and vehicle-to-infrastructure communication facilities, and wherein said vehicles, triggered by particular events, send event specific warning messages to their serving base station within said infrastructure.

Vehicle-to-vehicle (V2V) or vehicle-to-infrastructure (V2I) communication (subsumed as vehicle-to-X or simply V2X communication) is the enabling technology for intelligent transport systems (ITS), a topic which is receiving increasing interest both from the automotive as well as the telecommunications industry. ITS covers a variety of use cases with different requirements on the communication capabilities of the car, including active road safety, traffic efficiency, local services and ubiquitous Internet services including multimedia services). While the telecommunication infrastructure is to some extent already capable of fulfilling the requirements of certain uses cases (e.g. for some Internet applications), other use cases are more demanding and require additional enhancements of the current communication infrastructure.

One example of such a use case is Road Hazard Warning (RHW), which is characterized by stringent requirements on the transport network as following:
  High reliability of message transport
  Strong requirements on end-to-end latency
  Very high requirements on security (especially on the authentication of messages).

The scenarios where RHW is implemented also have some unique properties which lead to challenges on today's networks:
  The message sizes for RHW are relatively small (some hundred bytes), resulting in challenging transport efficiency
  The number of devices (i.e. vehicles) is large, and these devices are adding to other active devices for "traditional" services in the network.

For dissemination of danger warnings, ETSI (European Telecommunications Standards Institute) defined Decentralized Environmental Notification Messages (DENM)—described in ETSI, "TS 102 637-3 V1.1.1; Intelligent Transport Systems (ITS); Vehicular Communications; Basic Set of Applications; Part 3: Specifications of Decentralized Environmental Notification Basic Service", September 2010—, which cover a wide range of use cases from accident warning to emergency vehicle approaching warnings. The DENM specifications have been created under the umbrella of the ETSI TC ITS, which assumes a decentralized communication platform based on IEEE 802.11p. However, recent efforts aim at utilizing cellular mobile networks for ITS, such as 3GPP LTE (described in 3GPP, "TS 36.300 V10.5.0; Evolved Universal Terrestrial Radio Access (E-UTRA) and Evolved Universal Terrestrial Radio Access Network (E-UTRAN); Overall description", September 2011).

In the context of the present invention, uplink communication of warning messages, like DENM or DENM-like messages, in cellular networks such as 3GPP LTE is addressed. Some events (such as a car accident) will likely lead to many following events (such as hard brake warnings) in cars which are close to the original cause of the event. A large number of follow-up events may lead to a large number of follow-up warning messages, which in turn may lead to congestion on the air interface, QoS degradation and in the worst case to dropped messages. Yet, in prior art there are no effective means to avoid uplink congestion, which is essential in security-relevant applications, like e.g. RHW.

It is therefore an object of the present invention to improve and further develop an ITS enabled cellular mobile network of the initially described type and a method of the initially described type for operating such network in such a way that uplink congestion is avoided as far as possible, even in scenarios in which the offered load is very volatile with large peaks.

In accordance with the invention, the aforementioned object is accomplished by an ITS enabled cellular mobile network comprising the features of claim 1. According to this claim, such a network is characterized in that said base stations comprise an evaluation module being configured to analyze and categorize warning messages received from any of said vehicles according to predefinable criteria, and to estimate the number of vehicles that may be affected by the event related to a warning message, and a control module for performing uplink radio resource adaptation dependent on said warning message's category and said estimated number of affected vehicles.

Furthermore, the aforementioned object is accomplished by a network for operating an ITS enabled cellular mobile network comprising the features of claim 16. According to this claim, such a method is characterized in that at a base station, upon receiving a warning message from a vehicle, the following steps are performed:
  analyzing and categorizing said warning message according to predefinable criteria,
  estimating the number of vehicles that may be affected by the event related to said warning messages, and
  performing uplink radio resource adaptation dependent on said warning message's category and said estimated number of affected vehicles.

According to the invention it has first been recognized that significantly over-provisioning uplink radio resources in order to meet stringent requirements on delay and reliability, which is essential due to the critical content of the warning messages, is not feasible for mobile operators, since it wastes valuable radio resources that might be needed for other service types. As a solution, the present invention proposes to adapt uplink radio resources dynamically in an on-demand fashion. To this end, base stations are equipped with an evaluation module that analyzes warning messages received at the respective base station according to the context of the transmission and, based on the analysis results, performs a categorization of the warning messages. Furthermore, the number of vehicles, which may be affected by the event having triggered the transmission of a particular warning message, is estimated since this number is indicative of the traffic load to be expected as a result of the event.

Depending on a warning message's category and the associated estimated number of affected vehicles, a control module decides whether or not to adapt uplink radio resource and, if so, it further specifies and executes suitable means for realizing the adaptation. Hereinafter, evaluation module and control module sometimes will be commonly denoted ITS function.

To summarize, in order to avoid uplink congestion, the present invention proposes a dynamic adaptation of uplink radio resources by estimating the specific resource requirements which are derived from the warning message contents and the vehicular traffic density in the affected area. The dynamic reconfiguration of uplink radio resources enables reliable transmission of road hazard warning messages. Further, due to the provisioning of radio resources according to the current demand for warning messages, over-provisioning and wastage of radio resources is effectively avoided.

Advantageously, the categorization process takes into consideration different criteria for classifying warning messages. For instance, according to one embodiment the evaluation modules are configured to classify warning messages according to the severity of the associated event that triggered the transmission of a warning message. In this regard, different categories may be predefined together with a mapping of different types of events to these categories.

Additionally or alternatively, the evaluation modules may be configured to classify warning messages according to the time intervals between warning messages. For instance, in case a first warning messages followed by a plurality of further warning messages, it is very likely that the first warning message was triggered by a specific primary event, e.g. a road accident, and that all of the subsequent warning messages are transmitted due to secondary events, which are just a consequence of and directly related to the primary event, e.g. hard brakes carried out by vehicles in order to avoid rear-end collision accidents.

In a preferred embodiment the evaluation modules are configured to classify warning messages either as primary event warning message (e.g. resulting from a road accident) or as follow-up event warning message (e.g. related to hard brake events). Based thereupon, the evaluation modules can take very clear decisions regarding the further steps to be taken. For instance, it may be provided that the evaluation modules, in case of a warning message being classified as primary event warning message, trigger the respective control modules for performing uplink radio resource adaptation. Otherwise, i.e. in case the warning message is categorized just as a follow-up event warning message, the message is considered to be uncritical. In the latter case the control modules do not perform any radio resource adaptation.

In order to enable the control modules to perform suitable radio resource adaptation, information about the number of vehicles that may be affected by the event related to a warning message is provided. In this regard, it may be provided that each type of event has an associated relevance area. For instance, in case of an accident occurring on a country road the relevance area may be defined to extend 500 meters in each driving direction. On the other hand, in case of an accident occurring on a highway with separate lanes for each driving direction, the relevance area may be defined to extend only in one direction (opposite to the direction of travel of the lane which the accident happened). To account for the velocities that are generally higher than on country roads, the extension of the relevance area may be chosen to be larger, e.g. 1 km or more.

In a preferred embodiment the evaluation modules may be configured to obtain information about the number of affected vehicles within the coverage area of a respective base station or within the relevance area of a particular event from the mobile network itself. This can be done, e.g., by monitoring handover and/or mobility events. Additionally or alternatively, this information may be obtained from external sensors/sources. In another preferred embodiment the modules may be configured to estimate an expected number of follow-up event warning messages following a particular primary event warning message, in particular on the basis of the number of affected vehicles.

Depending on the radio access technology, different types of uplink radio resources can be dynamically configured. For instance, the control modules may be configured to perform radio resource adaptation by configuring random access resources, e.g. RACH (Random Access CHannel) in 3GPP LTE scenarios. According to a preferred embodiment random access resource adaptation may be performed by mapping an estimated number of follow-up event warning messages expected per second to PRACH (Physical Random Access CHannel) configuration indices.

Additionally or alternatively, uplink radio resource adaptation may be performed by configuring uplink control channel resources, e.g. PUCCH (Physical Uplink Control CHannel) in 3GPP LTE scenarios, and/or by configuring backoff timer values.

Depending on the category and/or purpose of a warning message, it may be propagated individually per base station. In particular, base stations may be configured to forward warning messages that have been classified as primary event warning messages to neighboring base stations of the network infrastructure. Generally, after decoding and categorization of warning messages, the ITS function may perform various actions on the warning message. Apart from delivering the warning message back to the base station network logic and forwarding it as mentioned above, these actions may include, e.g., warning message aggregation or any other kind of message processing.

In one embodiment the ITS enabled cellular mobile network is an LTE network. In this case vehicles are equipped with on-board units (OBU) with LTE communication facilities.

In still another embodiment the vehicles are equipped with sensor components for detecting accidents and/or potentially dangerous events. Sensor components may cooperate with the on-board units in such a way that an OBU automatically generates and transmits an appropriate warning message in case it receives a respective signal from any of the sensor components.

Figure 2:
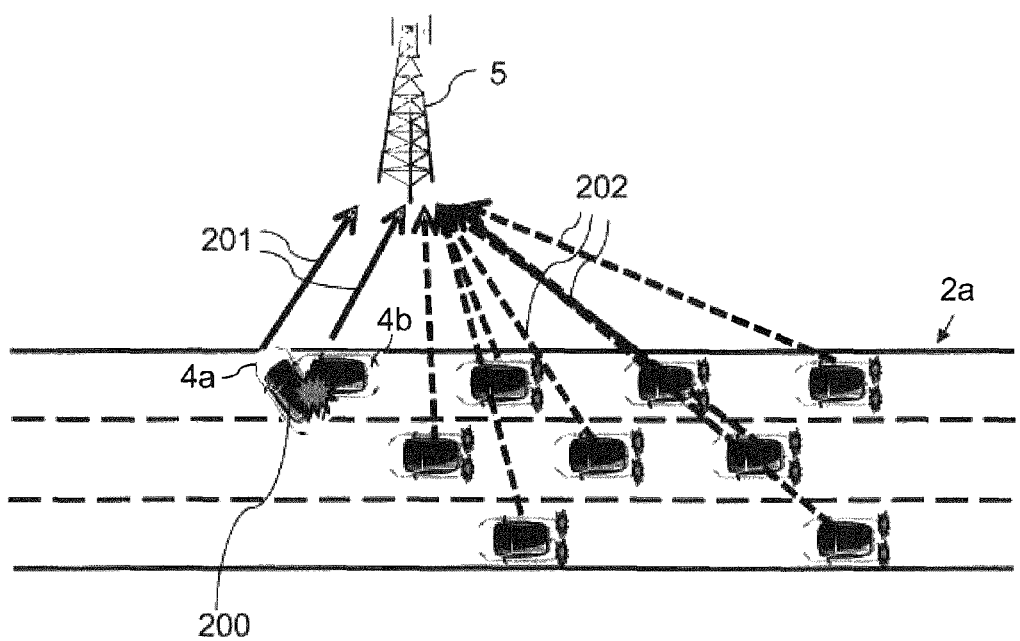
Figure 3:
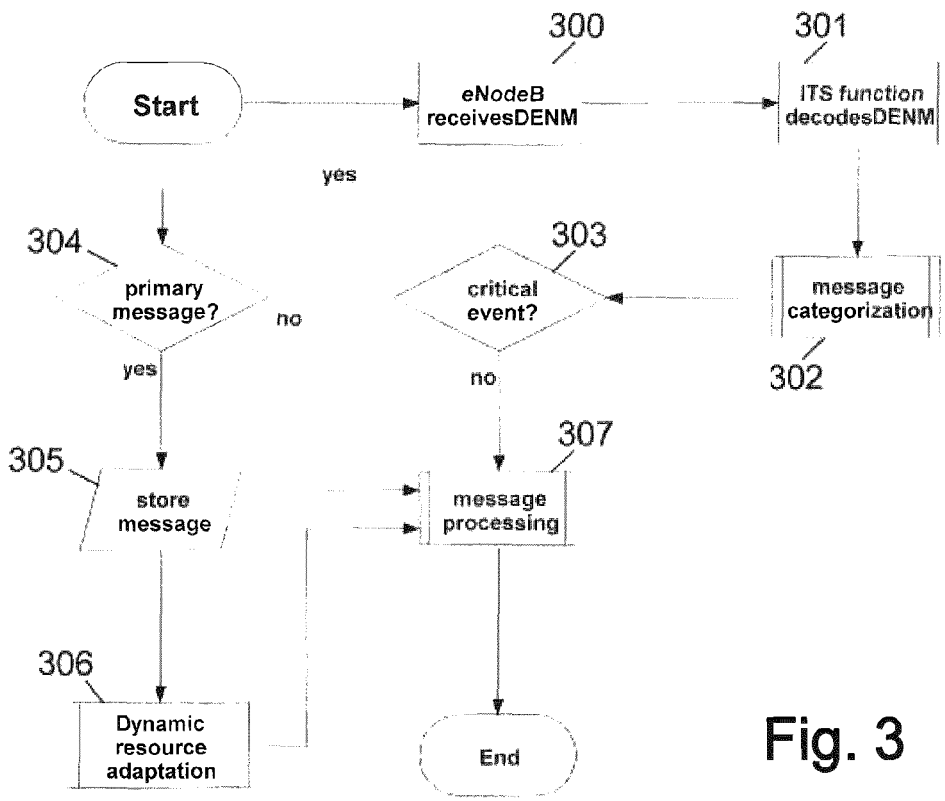
Figure 4:
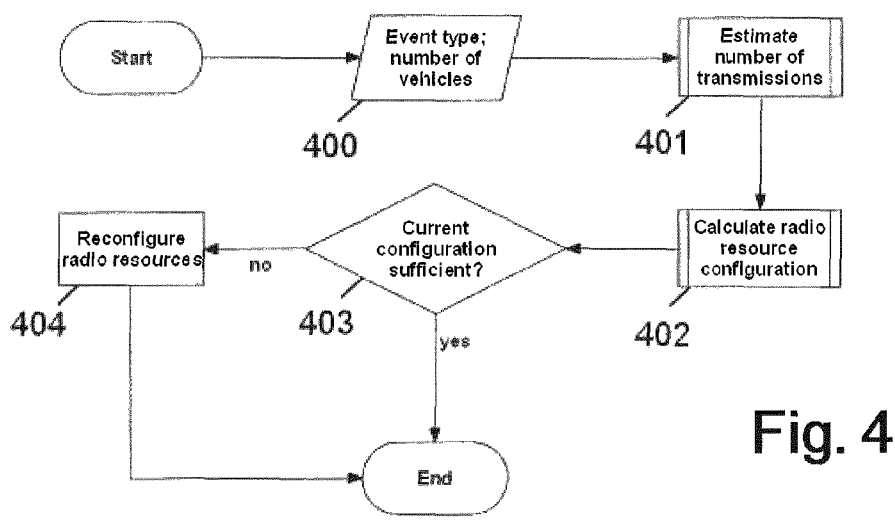
Figure 5:
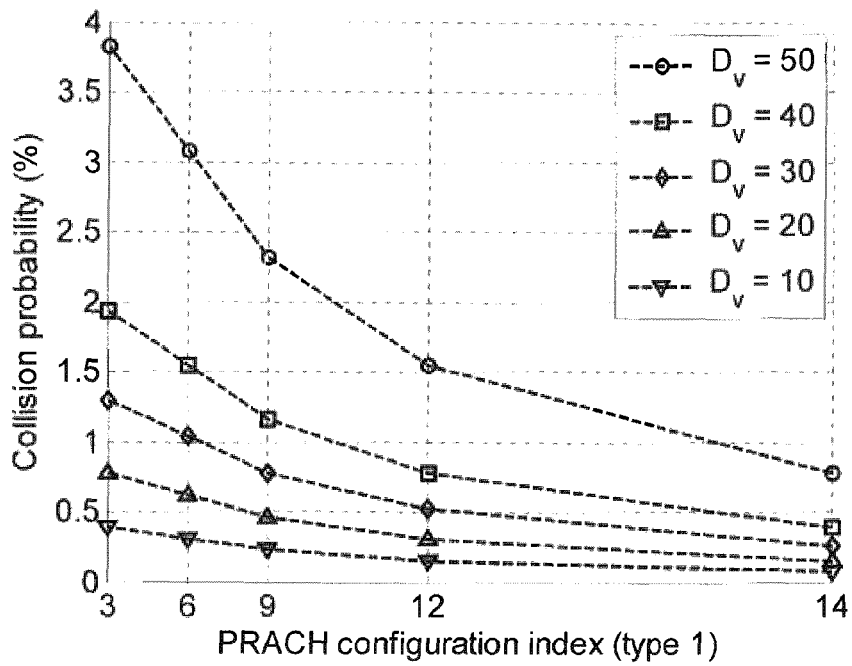
Figure 6:
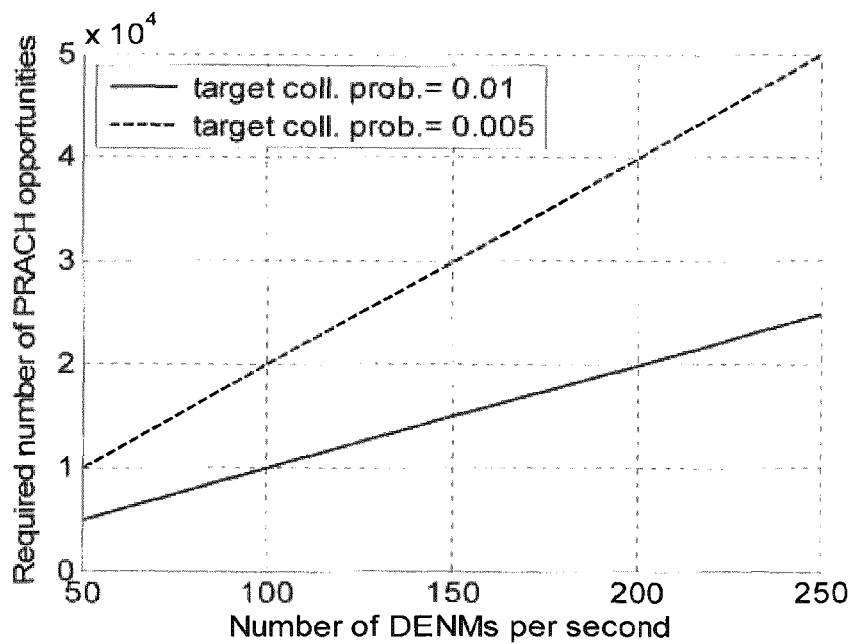

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing FIG. 1 is a schematic view illustrating the principle of operation of a method in accordance with an embodiment of the present invention, FIG. 2 is a schematic view illustrating a scenario example in which a method in accordance with the present invention can be applied, FIG. 3 is a flow chart illustrating the principle of operation of a method in accordance with an embodiment of the present invention, FIG. 4 is a flow chart illustrating a dynamic radio resource reconfiguration according to an embodiment of the present invention, FIG. 5 is a diagram illustrating a collision probability vs. PRACH configuration index for different vehicle densities, and FIG. 6 is a diagram illustrating a required minimal number of PRACH opportunities vs. a number of warning messages per second for different target collision probabilities.

FIG. 1 schematically illustrates the basic operation principle underlying the present invention. Although FIG. 1 is related to an LTE scenario, a person skilled in the art will understand that the present invention is not restricted to applications within networks of this specific standard, but that the invention may be implemented in any other cellular mobile communication network.

More specifically, FIG. 1 is related to a scenario on a highway 1 with separate lanes 2a, 2b in opposite directions of motion, as indicated by the bright arrows 3a, 3b. A total of six vehicles 4 is depicted for exemplary purposes, two of which heading on lane 2a from left to right and the remaining four heading on lane 2b from right to left.

As illustrated at 100 in FIG. 1, an accident occurred on one of the lanes 2a, with two vehicles 4—vehicles 4a, 4b—being involved in the accident. At least one of the involved vehicles 4—vehicle 4a—is equipped with vehicle-to-x communication facilities and sends an accident warning message to its serving base station 5a, as indicated at 101. In the embodiment of FIG. 1 the warning message is assumed to be a DENM (Decentralized Environmental Notification Messages), however, warning messages following any other specifications may be employed likewise, as will be appreciated by those skilled in the art.

In accordance with the present invention the base station 5a is equipped with an evaluation module (not shown in FIG. 1) for warning message analysis and with a control module (not shown in FIG. 1) for uplink radio resource adaptation. Hereinafter, in certain contexts both components are commonly referred to as 'ITS function'. Generally, the ITS function decides the next actions depending on the content of the DENM, described in more detail below in connection with FIGS. 3 and 4.

If appropriate according to the ITS function, the serving base station 5a forwards the DENM in the next available transmission time interval (TTI) to all qualified vehicles within the coverage area of the base station 5a, i.e. to all those vehicles for which the DENM may be of importance due to their location, direction of motion, velocity or any other parameters of relevance. For example, in the scenario illustrated in FIG. 1, the DENM may be sent to all those vehicles that travel in the same direction as vehicle 4a (which sent the DENM) and that are behind vehicle 4a. This DENM transmission is illustrated at 102.

Simultaneously, as indicated at 103 in FIG. 1, the serving base station 5a forwards the DENM via backhaul to at least one base station 5b in the opposite direction of the driving direction of the road side where the accident occurred (lane 2a). Base stations along the road receive this message and send them to the vehicles in their coverage area. Propagation of DENMs is done individually per base station and depends on the purpose and priority of the DENM, as described in more detail in ETSI, "TS 102 637-3 V1.1.1; Intelligent Transport Systems (ITS); Vehicular Communications; Basic Set of Applications; Part 3: Specifications of Decentralized Environmental Notification Basic Service", September 2010.

Basically, in ITS scenarios the offered load is directly related to the number of vehicles in the coverage area of a base station, e.g. an eNodeB in LTE scenarios, and to the type of event which triggers transmission of a DEN message. The offered load is consequently very volatile with large peaks, and additionally with stringent requirements on delay and reliability due to the critical content of the messages. In order to meet these requirements, a mobile operator would have to perform a significant over-provisioning of resources. However, this approach is not resource efficient as it consumes radio resources for data transmission and for other service types.

The assumption underlying the present invention is that many (ideally all) vehicles are equipped with V2X communication devices, for instance in form of on-board units (OBU) with LTE communication, and with RHW capabilities (e.g., the ability to detect accidents or potential danger). As already explained above, some events (such as a car accident, primary event) will likely lead to many following events (such as hard brake warnings, follow-up events) in cars which are close to the original cause of the event. A large number of follow-up events may lead to a large number of follow-up DENM, and thus to congestion on the air interface, QoS degradation and in the worst case to dropped messages.

FIG. 2, in which same reference numerals denote same components as in FIG. 1, shows an example scenario where a traffic peak arises due to a hazardous event on one lane 2a of a highway 1. Like in the scenario of FIG. 1, at 200 an accident occurred, which triggers transmission of accident warning messages, indicated at 201, to base station/eNodeB 5. Following this event, at 202, many follow-up events occur very shortly after this first event. In the scenario, the vehicles 4 perform hard breaks, each vehicle 4 triggering transmission of a DEN warning message to base station 5. The number of follow-up message can be very large, depending on the current vehicle density, which in turn may lead to blocking or dropping of messages.

In order to guarantee message transmission and to avoid congestion, in accordance with an embodiment of the present invention the following overall procedure may be performed:

It is assumed that the base station/eNodeB 5 is equipped with an additional functional entity, denoted ITS function, which is capable of decoding DENM messages and of reconfiguring base station 5. DENM messages are forwarded by the base station to the ITS function. The ITS function is aware of the approximate number of vehicles 4 in the coverage area of the base station 5. This information can be obtained from the mobile network, e.g. by monitoring hand-over events, or from external sensors/sources.

If the ITS function receives a DEN message, it processes the message by means of an evaluation module and categorizes it according to several criteria, such as the severity of the warning message, and/or the time interval between messages pertaining to the same triggering event. If certain criteria are fulfilled, the message is categorized as primary event warning message and the message or message properties are stored. Otherwise, the message is categorized as a follow-up event warning message, which means that the message is treated as an uncritical message that does not require radio resource adaptation.

Upon reception of a primary message, the ITS function configures the uplink radio resources of the base station 5 such that the expected large number of follow-up messages can be transported within the target QoS metrics such as delay or dropping/blocking probability, as will be explained in more detail below.

FIG. 3 is a flow chart that illustrates the operational principle of dynamic uplink radio resource adaptation in an LTE scenario according to an embodiment of the present invention.

Upon reception, at 300, of an event specific warning message—hereinafter briefly denoted DENM—, the eNodeB (base station 5 of FIG. 2) forwards the DENM to the ITS-function, which decodes the message, at 301. At 302, the ITS function or, more specifically, the evaluation module of eNodeB performs message categorization according to predefined criteria. In case the categorization results in that the event that triggered the transmission of the DENM is critical, at 303, the DENM, at 304, is further analyzed. Specifically, it is determined whether the DENM is a primary event warning message or a follow-up event warning message. In the first case, the DENM will be stored, at 305, and dynamic uplink resource adaptation will be performed, at 306. In the latter case, or in case the DENM is qualified as being not critical, no resource adaptation is required, and the DENM is just regularly processed, at 307, e.g. forwarded to neighboring eNodeBs.

An exemplary dynamic radio resource reconfiguration process in accordance with an embodiment of the present invention is illustrated in FIG. 4. As indicated at 400, according to the invention dynamic resource adaptation takes into account the type of the primary DENM received at a base station as well as the number of the vehicles that may be affected by the event which triggered the transmission of the primary DENM. The respective analysis is performed by an evaluation module of an ITS function of the base station. For instance, the number of potentially affected vehicles can be estimated from hand-over and mobility events (such as location updates) or from external sources/sensors.

In a next step, indicated at 401, the expected number of follow-up DENM transmission attempts is determined, which can be estimated from the number of affected vehicles in the coverage area of the base station.

According to a preferred embodiment an estimation algorithm for determining an estimate number of follow-up transmissions is implemented in the following way:

The number of transmission attempts per second is estimated as $$T_{DENM,sec} = N_{v,sec} \times K_{rep},$$

where $N_{v,\,sec}$ is the expected number of affected vehicles and $K_{rep}$ is a scaling factor describing the repetition of the DENM transmissions per second ($K_{rep} \geq 1$). $N_{v,\,sec}$ can be estimated as $$N_{v,sec} = D_v \times R_{DENM} \times K_R,$$

where $D_v$ is the vehicle density in the propagation area (vehicles/road unit), $R_{DENM}$ is the DENM relevance area as defined in ETSI, "TS 102 637-3 V1.1.1; Intelligent Transport Systems (ITS); Vehicular Communications; Basic Set of Applications; Part 3: Specifications of Decentralized Environmental Notification Basic Service", September 2010. $K_R$ is a scaling factor for the relevance area. It is noted that $K_R$ can be used to anticipate message propagation in the coverage area of the eNodeB; its value should be chosen taking the dissemination area of the primary DENM into account, which need not be necessarily equal to the relevance area.

Based on the obtained results, at 402, the radio resource configuration is calculated. At 403, the ITS function checks whether the current radio resource configuration is sufficient to cope with the expected traffic load within the target QoS metrics. In case the current configuration is sufficient, the algorithm terminates, otherwise the radio resources are reconfigured, as indicated at 404.

In the following an embodiment for random access radio resource reconfiguration in a 3GPP LTE scenario will be described in some more detail.

In LTE, uplink transmissions require a bandwidth grant allocated from the eNodeB to the mobile terminal, denoted UE (User Equipment) in 3GPP, which define a number of resources on the UL-SCH (uplink shared channel). Bandwidth is granted upon reception of scheduling requests (SRs), which are transmitted either on the physical uplink control channel (PUCCH), if the UE is in RRC_CONNECTED state, or by performing the random access procedures on the logical random access channel (RACH) if no PUCCH resource are available or if the UE is in RRC_IDLE state. Both methods are limited by the number of physical radio resources which are commonly configured statically by the operator according to expected long-term average offered load in the network.

For random access resources in LTE, $T_{DENM,\,sec}$ can be mapped to the PRACH configuration indices in order to meet a maximum collision probability for random access attempts per random access resources as follows:

$$\text{prach-ConfigurationIndex} = \operatorname{argmin}_{ci}\{R_{conf}(ci) > R_{req}\}$$

where the required PRACH opportunities $R_{req}$ are calculated according to a target collision probability $P_c$ as $$R_{req} = -T_{DENM,sec}/\ln(1-P_c),$$

and the configured PRACH opportunities $R_{conf}$ are calculated as $$R_{conf}(ci) = N_{SF}(ci) * N_{PR} * 100,$$

where $N_{SF}$ is the number of configured subframes per frame and $N_{PR}$ is the number of allocated PRACH preambles. $N_{SF}$ is defined in 3GPP, "TS 36.211 V10.4.0; Evolved Universal Terrestrial Radio Access (E-UTRA); Physical Channels and Modulation", December 2011, Section 5.7. We assume $N_{PR}=64$. In the same document, in Table 5.7.1-2 on page 41, the PRACH configuration indices ci are specified as follows:

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |

-continued

| PRACH Configuration Index | Preamble Format | System frame number | Subframe number |
|---|---|---|---|
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

The required prach-Configuration Index, corresponding to the number of configured PRACH opportunities, for different vehicle densities and target collision probabilities is exemplarily shown in the following Table:

| | Target collision probability | | | | |
|---|---|---|---|---|---|
| vehicle density | 10 | 20 | 30 | 40 | 50 |
| 1% | 3 | 6 | 9 | 12 | 12 |
| 0.5% | 6 | 12 | 12 | 14 | 14 |

It is noted that for calculating the values specified in the table the scaling factors introduced above were set equal to 1.

The following calculations show the necessity for a reconfiguration of radio resources, in this case random access resources, according to the DENM transmission rate. FIG. 5 shows the collision probability of a DENM transmission attempt for different vehicle densities $D_v$, ranging from 10 vehicles per kilometer to 50 vehicles per kilometer. The cell radius is assumed to be 2.5 km, where the road is a straight line crossing the center of the cell. The collision probability is calculated as $P_{col} = 1 - \exp(-T_{DENM,sec}/\text{configured PRACH opportunities})$.

On the x-axis, prach-Configuration Index is shown which corresponds to a number of PRACH opportunities in the set of {6400, 12800, 19200, 32000, 64000}. It can be observed that with high vehicle densities, the collision probabilities are well above the maximum tolerable collision probability of 1%. Accordingly, FIG. 6 shows the required number of PRACH opportunities versus the number of DENMs per second for two different target collision probabilities.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An intelligent transport system (ITS) enabled cellular mobile network, comprising:
   one or more vehicles equipped with both vehicle-to-vehicle and vehicle-to-infrastructure communication facilities and configured to transmit event specific warning messages; and
   a base station of a radio access network of the ITS enabled cellular mobile network and comprising:
      a transceiver configured to receive, from one of the one or more vehicles, an event specific warning message triggered by a triggering event; and
      one or more processors configured to perform, locally at the base station of the radio access network of the ITS enabled cellular mobile network without involvement of a core network of the ITS enabled cellular mobile network:
         analysis of the event specific warning message;
         assignment, according to predefined criteria, of a category to the event specific warning message;
         estimation of a number of vehicles that may be affected by the triggering event; and
         adaptation of uplink radio resources of the base station used on the category of the event specific warning message and the estimated number of affected vehicles,
   wherein the one or more processors are configured to perform adaptation of uplink radio resources of the base station based on the category of the event specific warning message and the estimated number of affected vehicles by configuring random access resources by mapping an estimated number of follow-up event warning messages expected per second to PRACH (Physical Random Access CHannel) configuration indices.

2. The network according to claim 1, wherein the one or more processors are further configured to classify the event specific warning message according to a severity of the triggering event.

3. The network according to claim 1, wherein the one or more processors are further configured to classify the event specific warning message according to time intervals between warning messages related to the event specific warning message.

4. The network according to claim 1, wherein the one or more processors are further configured to classify the event specific warning message as a primary event warning message or as a follow-up event warning message.

5. The network according to claim 4, wherein the one or more processors perform uplink radio resource adaptation in response to classifying the event specific warning message as a primary event warning message.

6. The network according to claim 4, wherein the one or more processors are configured to estimate a number of expected follow-up event warning messages following the classification of the event specific warning message as a primary event warning message based on the estimated number of affected vehicles.

7. The network according to claim 4, wherein the base station is configured to forward the event specific warning message to neighboring base stations in response to classifying the event specific warning message as a primary event warning message.

8. The network according to claim 1, wherein the triggering event has an associated relevance area.

9. The network according to claim 1, wherein the one or more processors are configured to estimate the number of vehicles that may be affected by the triggering event within a coverage area of the base station or within a relevance area of the triggering event by monitoring handover and/or mobility events.

10. The network according to claim 1, wherein the one or more processors are configured to perform uplink radio resource adaptation by configuring uplink control channel resources.

11. The network according to claim 1, wherein the one or more processors are configured to perform uplink radio resource adaptation by configuring backoff timer values.

12. The network according to claim 1, wherein the one or more vehicles are further equipped with on-board units (OBU) with long term evolution (LTE) communication facilities.

13. The network according to claim 1, wherein the one or more vehicles are further equipped with sensor components for detecting accidents and/or potentially dangerous events.

14. A method for operating an intelligent transport system (ITS) enabled cellular mobile network including one or more vehicles equipped with both vehicle-to-vehicle and vehicle-to-infrastructure communication facilities and a base station of a radio access network of the ITS enabled cellular mobile network including a transceiver and one or more processors, the method comprising:
receiving, by the transceiver of the base station from one of the one or more vehicles, an event specific warning message triggered by a triggering event;
analyzing, by the one or more processors of the base station without involvement of a core network of the ITS enabled cellular mobile network, the event specific warning message;
assigning, according to predefined criteria by the one or more processors of the base station without involvement of a core network of the ITS enabled cellular mobile network, a category to the event specific warning message,
estimating, by the one or more processors of the base station without involvement of a core network of the ITS enabled cellular mobile network, a number of vehicles that may be affected by the triggering event, and
performing, by the one or more processors of the base station without involvement of a core network of the ITS enabled cellular mobile network, adaptation of uplink radio resources of the base station based on the assigned category and the estimated number of vehicles affected by the triggering event,
wherein the performing, by the one or more processors of the base station, adaptation of uplink radio resources of the base station based on the assigned category and the estimated number of affected vehicles comprises configuring random access resources by mapping an estimated number of follow-up event warning messages expected per second to PRACH (Physical Random Access CHannel) configuration indices.

* * * * *